US009386592B2

(12) United States Patent
Le Houerou et al.

(10) Patent No.: US 9,386,592 B2
(45) Date of Patent: Jul. 5, 2016

(54) METHOD AND DEVICE FOR MANAGING COMMUNICATIONS IN A WIRELESS NETWORK, METHOD FOR SETTING UP A SECOND COMMUNICATION, CORRESPONDING COMPUTER PROGRAM PRODUCT AND STORAGE MEANS

(75) Inventors: Brice Le Houerou, Acigne (FR); Pascal Lagrange, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 412 days.

(21) Appl. No.: 12/916,447

(22) Filed: Oct. 29, 2010

(65) Prior Publication Data
US 2011/0103248 A1 May 5, 2011

(30) Foreign Application Priority Data

Oct. 30, 2009 (FR) ...................................... 09 57703

(51) Int. Cl.
*H04W 24/00* (2009.01)
*H04W 72/08* (2009.01)
(52) U.S. Cl.
CPC .................................... *H04W 72/082* (2013.01)
(58) Field of Classification Search
CPC ................................................. H04W 72/082
USPC .......................................... 370/252, 255, 322
See application file for complete search history.

(56) References Cited

U.S. PATENT DOCUMENTS

| 6,415,005 | B2 * | 7/2002 | Koga et al. ..................... 375/347 |
| 6,967,944 | B2 | 11/2005 | Choi .............................. 370/348 |
| 2008/0205451 | A1 * | 8/2008 | Ramesh et al. ................ 370/491 |

(Continued)

FOREIGN PATENT DOCUMENTS

| EP | 1 830 534 A1 | 9/2007 |
| EP | 1 873 957 A1 | 1/2008 |
| EP | 1 947 813 A1 | 7/2008 |

OTHER PUBLICATIONS

U.S. Appl. No. 12/905,060, filed Oct. 14, 2010 by Patrice Nezou; Pascal Lagrange; and Lionel Tocze.

*Primary Examiner* — Donald Mills
*Assistant Examiner* — Henry Baron
(74) *Attorney, Agent, or Firm* — Fitzpatrick, Cella, Harper & Scinto

(57) ABSTRACT

A method is proposed for managing communications in a wireless network in which a first communication is set up or established on a plurality of carriers between a first sender device and a receiver device, the network comprising a set of at least one second sender device for which a second communication has to be established simultaneously with said first communication.
Such a method comprises steps of:
  allocating a set comprising at least one carrier among said plurality of carriers to each second sender device;
  obtaining (, for each second sender device, a level of reception power of a predetermined signal sent by said second sender device on the set of carrier(s) that have been allocated to it;
  estimating a rate of disturbance of said first communication by one said or several said second communications as a function of the power level(s) obtained for the second sender device(s);
  authorizing the second sender device(s), for which the estimated rate(s) of disturbance is or are below a predefined threshold, to set up a said second communication on the plurality of carriers.

14 Claims, 9 Drawing Sheets

(56) References Cited

U.S. PATENT DOCUMENTS

| | | | |
|---|---|---|---|
| 2009/0161572 A1 | 6/2009 | Lagrange et al. | 370/252 |
| 2009/0180521 A1* | 7/2009 | Joseph et al. | 375/148 |
| 2009/0257358 A1 | 10/2009 | Stamoulis et al. | 370/252 |
| 2010/0128713 A1 | 5/2010 | Le Bars et al. | 370/347 |
| 2010/0159832 A1 | 6/2010 | Lagrange et al. | 455/41.2 |
| 2010/0195556 A1 | 8/2010 | Tocze et al. | 370/312 |
| 2010/0290407 A1* | 11/2010 | Uemura | 370/329 |
| 2012/0149427 A1* | 6/2012 | Perets et al. | 455/522 |

* cited by examiner

| Signatures | Carriers | | | | | | | | | | | |
|---|---|---|---|---|---|---|---|---|---|---|---|---|
| signature1 | 1 | 33 | 65 | 97 | 129 | 161 | 193 | 225 | 257 | 289 | 321 | 353 |
| signature2 | 5 | 37 | 69 | 101 | 133 | 165 | 197 | 229 | 261 | 293 | 325 | 357 |
| signature3 | 9 | 41 | 73 | 105 | 137 | 169 | 201 | 233 | 265 | 297 | 329 | 361 |
| signature4 | 13 | 45 | 77 | 109 | 141 | 173 | 205 | 237 | 269 | 301 | 333 | 365 |
| signature5 | 17 | 49 | 81 | 113 | 145 | 177 | 209 | 241 | 273 | 305 | 337 | 369 |
| signature6 | 21 | 53 | 85 | 117 | 149 | 181 | 213 | 245 | 277 | 309 | 341 | 373 |
| signature7 | 25 | 57 | 89 | 121 | 153 | 185 | 217 | 249 | 281 | 313 | 345 | 377 |
| signature8 | 29 | 61 | 93 | 125 | 157 | 189 | 221 | 253 | 285 | 317 | 349 | 381 |

Figure 7a

| Signatures | Carriers | | | | | | | | | | |
|---|---|---|---|---|---|---|---|---|---|---|---|
| signature1 | 2 | 34 | 66 | 98 | 130 | 162 | 194 | 226 | 258 | 290 | 322 |
| signature2 | 6 | 38 | 70 | 102 | 134 | 166 | 198 | 230 | 262 | 294 | 326 |
| signature3 | 10 | 42 | 74 | 106 | 138 | 170 | 202 | 234 | 266 | 298 | 330 |
| signature4 | 14 | 46 | 78 | 110 | 142 | 174 | 206 | 238 | 270 | 302 | 334 |
| signature5 | 18 | 50 | 82 | 114 | 146 | 178 | 210 | 242 | 274 | 306 | 338 |
| signature6 | 22 | 54 | 86 | 118 | 150 | 182 | 214 | 246 | 278 | 310 | 342 |
| signature7 | 26 | 58 | 90 | 122 | 154 | 186 | 218 | 250 | 282 | 314 | 346 |
| signature8 | 30 | 62 | 94 | 126 | 158 | 190 | 222 | 254 | 286 | 318 | 350 |

Figure 7b

|  | N1 | N2 | N3 | N4 | N5 | N6 | N7 | N8 |
|---|---|---|---|---|---|---|---|---|
| Carriers | 1 | 5 | 9 | 13 | 17 | 21 | 25 | 29 |
| | 2 | 6 | 10 | 14 | 18 | 22 | 26 | 30 |
| | 3 | 7 | 11 | 15 | 19 | 23 | 27 | 31 |
| | 33 | 37 | 41 | 45 | 49 | 53 | 57 | 61 |
| | 34 | 38 | 42 | 46 | 50 | 54 | 58 | 62 |
| | 35 | 39 | 43 | 47 | 51 | 55 | 59 | 63 |
| | 65 | 69 | 73 | 77 | 81 | 85 | 89 | 93 |
| | 66 | 70 | 74 | 78 | 82 | 86 | 90 | 94 |
| | 67 | 71 | 75 | 79 | 83 | 87 | 91 | 95 |
| | 97 | 101 | 105 | 109 | 113 | 117 | 121 | 125 |
| | 98 | 102 | 106 | 110 | 114 | 118 | 122 | 126 |
| | 99 | 103 | 107 | 111 | 115 | 119 | 123 | 127 |
| | 129 | 133 | 137 | 141 | 145 | 149 | 153 | 157 |
| | 130 | 134 | 138 | 142 | 146 | 150 | 154 | 158 |
| | 131 | 135 | 139 | 143 | 147 | 151 | 155 | 159 |
| | 161 | 165 | 169 | 173 | 177 | 181 | 185 | 189 |
| | 162 | 166 | 170 | 174 | 178 | 182 | 186 | 190 |
| | 163 | 167 | 171 | 175 | 179 | 183 | 187 | 191 |
| | 193 | 197 | 201 | 205 | 209 | 213 | 217 | 221 |
| | 194 | 198 | 202 | 206 | 210 | 214 | 218 | 222 |
| | 195 | 199 | 203 | 207 | 211 | 215 | 219 | 223 |
| | 225 | 229 | 233 | 237 | 241 | 245 | 249 | 253 |
| | 226 | 230 | 234 | 238 | 242 | 246 | 250 | 254 |
| | 227 | 231 | 235 | 239 | 243 | 247 | 251 | 255 |
| | 257 | 261 | 265 | 269 | 273 | 277 | 281 | 285 |
| | 258 | 262 | 266 | 270 | 274 | 278 | 282 | 286 |
| | 259 | 263 | 267 | 271 | 275 | 279 | 283 | 287 |
| | 289 | 293 | 297 | 301 | 305 | 309 | 313 | 317 |
| | 290 | 294 | 298 | 302 | 306 | 310 | 314 | 318 |
| | 291 | 295 | 299 | 303 | 307 | 311 | 315 | 319 |
| | 321 | 325 | 329 | 333 | 337 | 341 | 345 | 349 |
| | 322 | 326 | 330 | 334 | 338 | 342 | 346 | 350 |
| | 323 | 327 | 331 | 335 | 339 | 343 | 347 | 351 |

Figure 8

METHOD AND DEVICE FOR MANAGING COMMUNICATIONS IN A WIRELESS NETWORK, METHOD FOR SETTING UP A SECOND COMMUNICATION, CORRESPONDING COMPUTER PROGRAM PRODUCT AND STORAGE MEANS

1. FIELD OF THE DISCLOSURE

The field of the disclosure is that of communications networks and more particularly that of wireless communications networks such as, for example, wireless home communications networks using the 60 GHz radio band.

More specifically, the disclosure relates to a technique for managing communications in a wireless communications network. Such a technique is aimed at setting up simultaneous communications in the network.

2. BACKGROUND OF THE DISCLOSURE

Home wireless networks or PANs (Personal Area Networks) can be wired (as is the case for USB type and Ethernet type networks or again according to the IEEE 1394 standards) but may also rely on the use of a wireless medium. The term used then is "wireless home networks" or "wireless personal area networks" (WPAN). The Bluetooth (IEEE 802.15.1), UWB, ZigBee (IEEE 802.15.4), IEEE 802.11e or IEEE 802.15.3 standards are to date among the most widely used protocols for networks of this type.

One type of access commonly used by such protocols is the time division multiple access (TDMA) mode. This second mode of access is a multiplexing mode used to transmit several signals on only one communications channel. This is time division multiplexing, the principle of which entails the subdivision of the available time into several time slots which are then allocated to the different devices of the network.

Radio transmission systems currently use a wide range of transmission frequencies, generally ranging from 2.5 GHz to 60 GHz. These frequencies are particularly well suited to data transmission at very high bit rates in a limited range, for example as means of connectivity between the different elements of a "home cinema" type communications network.

The use of transmission and reception antennas may furthermore play a crucial role in the quality of communications for wireless home networks of this kind. Indeed, to set up a satisfactory link budget, it is necessary to adapt the parameters of configuration of these antennas to each instance of setting up communications.

Such communications systems are however highly sensitive to interference and shadowing of radio communication links. In the context of a static configuration of a home network, these phenomena can be caused, for example, by the presence of objects such as furniture, plants, or by the presence of living beings. These phenomena may thus create isolation (i.e. cut the communication link) between a sender device and a receiver device. These phenomena therefore have a direct influence on the quality of communications in the network.

Generally, in a wireless communications system, for example a 5.1 type <<home cinema>> system supporting the transmission of video as well as audio between the different devices, the non-compressed video application uses 90% of the bandwidth of the system and necessitates the implementation of two devices (a source device for the transmission of the video data and a destination devicer for the video display), while the audio application uses only 10% of the bandwidth of the system and necessitates the implementation of six devices. The resources of the system are therefore monopolized up to 90% by only two of the eight devices of the system.

In this context, it would therefore appear to be particularly useful to be able to determine the possibility, for each of the six devices used by the audio application, to set up or establish a communication simultaneously with the communication set up or established between the two devices used by the video application. Thus, the bandwidth allocated to each of the six devices used by the audio application can be increased.

There are several known techniques for managing simultaneous communications in a communications system.

One known technique, presented in the patent document U.S. Pat. No. 6,967,944, proposes to simultaneously implement point-to-point type communications, each involving a sender device and a receiver device. This technique relies on the implementation of an analysis of the received signal strength indication (<<RSSI>>) for each receiver device. Thus, each receiver device checks the quality of the point-to-point communication. According to this known technique, the setting up of a point-to-point communication is therefore conditioned by the detection of a satisfactory quality of communication.

One major drawback of this known technique is that it entails a major latency time. Indeed, each receiver device must perform the analysis of an RSSI level. Thus, the greater the increase in the number of receiver devices (and hence the simultaneous communications to be set up), the longer is the latency time of implementation.

Furthermore, this known technique cannot be used to verify the level of interference from one communication to another communication. It is therefore possible to lower the quality of communication of the network.

Finally, the efficiency of this known technique is limited by the fact that the RSSI levels are comparables only if the receiver antennas have an identical antenna or implement a same set of antenna parameters. This known technique therefore proves to be ill-suited to the case of 60 GHz communications systems in which different sets of antenna parameters are implemented.

3. SUMMARY OF THE DISCLOSURE

An embodiment of the disclosure relates to a method for managing communications in a wireless network in which a first communication is set up on a plurality of carriers between a first sender device and a receiver device, said network comprising a set of at least one second sender device for which a second communication has to be established simultaneously with said first communication. The method is such that a manager device performs the steps of:
- allocating a set comprising at least one carrier among said plurality of carriers to each second sender device, the carrier(s) allocated to each second sender device being distinct;
- obtaining, for each second sender device, a reception power level for a predetermined signal sent by said second sender device on its respective allocated set of carrier(s);
- determining network communication conditions, based on the power level(s) obtained for the second sender device(s).

Thus, in this particular embodiment, it is proposed to allocate a distinct set of carriers (for example, OFDM carriers) to the network devices, to identify each device when they communicate concurrently, and from this information, determine which device is out of range and whether or not it may disturb other communications.

According to one advantageous characteristic, said step of determining network communication conditions comprises a step of estimating a rate of disturbance of said first communication by one said or several said second communications as a function of the power level(s) obtained for the second sender device(s). Advantageously, said manager device performs a step of:

authorizing the second sender device(s), for which the estimated rate(s) of disturbance is or are below a predefined threshold, to set up a said second communication on the plurality of carriers.

Thus, in this particular embodiment, it is proposed to set up one or more second communications simultaneously with a first communication provided that the second communication or communications do not disturb the first communication.

Thus, the level of interference that each second communication would have on the first communication is estimated. To this end, each second sender device is allocated a set of carriers among the plurality of carriers used for the first communication between the first sender device and the receiver device. In one particular embodiment, each set of allocated carriers is distributed uniformly on the spectrum covered by the plurality of carriers. Thus, each allocated set of carriers represents the spectrum covered by the plurality of the carriers.

Each second sender device then uses the set of carriers that has been allocated to it to send a predetermined signal (or test signal). Thus, the sending of such a predetermined test signal by a second given sender device enables the estimating of the rate of disturbance that the second communication of the second given sender device would have had on the first communication.

Thus, the levels of interference due to the second communications are estimated without implementing them.

Thus, it is possible to process several second sender devices simultaneously and then reduce the reaction time of the system when setting up the second communication(s).

It can be noted that the greater the number of carriers in the allocated set of carriers, the more precise will be the estimation of the disturbance rate.

It can be noted that the device which allocates the sets of carriers to the second sender devices and permits the second sender devices to set up the simultaneous second communications can:

either itself perform (and in this sense "obtain") the estimations of the disturbance levels;

or receive (and in this sense "obtain") estimations of disturbance levels coming from another device of the network (for example the receiver device).

For a second given sender device, if the estimated rate of disturbance is below a predefined threshold, then the given sender device is permitted to set up a second communication simultaneously with the first communication. The second communication is then implemented on the plurality of carriers on which the first communication is established.

In one particular embodiment, the second sender devices which have been permitted to set up a second communication, set up their second communication each one their turn.

In a particular embodiment, the first communication is a point-to-point type communication and the second communication or communications are point-to-multipoint communications.

According to one advantageous characteristic, in the step of allocating each second sender device a set comprising at least one carrier among said plurality of carriers, the allocation of the carrier or carriers is done so as to be distributed on the plurality of carriers.

In this way, having a fading on all the transmission channels is guaranteed. Indeed, the discussed technique for managing communications avoids the eventuality of ending up with a selection of carriers only representative of low frequencies (or high frequencies respectively) of the spectrum covered by the plurality of carriers while the fading of the signal can occur solely on the low frequencies (and high frequencies respectively).

Advantageously, the first communication is set up during a first time slot of a transmission cycle. Advantageously, the predetermined signal or signals is or are sent out by the second sender device or devices during a second time slot of said transmission cycle, different from the first time slot.

Thus, the discussed technique for managing communications provides for a reserve time slot to transmit predetermined signals (spectral signatures). The fact that all the sender devices which wish to set up a simultaneous communication send out their predetermined signal during a same time slot makes it possible to swiftly determine the possible simultaneous communication or communications while at the same time restricting the network resources used.

Advantageously, said second communication or communications are set up after a predetermined duration starting from the starting instant of said first time slot The start of the first time slot corresponds to the most sensitive part of the first communication. Indeed, the receiver device uses the start of this first time slot to get synchronized in the network. Thus, the discussed technique for managing communications avoids having to set up a simultaneous communication at the beginning of this first time slot to avoid any risk of de-synchronization of the receiver device.

According to one advantageous characteristic, each allocated set of carriers is separated from another allocated set of carriers by a frequency distance greater than a first threshold as a function of an acceptable frequency error tolerance in the network.

Thus, any risk of interference between the different sets of carriers allocated to the different sender devices is averted. Preferably, the first threshold is set at: 2×[(integer value below F/e)+2], with Fe being the acceptable maximum radio frequency error as defined by the wireless network.

Advantageously, for a second given sender device, the power level of the received predetermined signal is a function of the power levels received through at least one carrier of the set of carriers allocated to said second given sender device.

Thus, in one particular embodiment, the technique for managing communications determines an apparent power level associated with each second sender device. In a first example, this apparent power level is equal to the maximum value of the power values obtained through each of the carriers of the allocated sets of carriers allocated to the second sender device considered. In the second example, this apparent power level is equal to the average value of power of the selection of carriers obtained through each of the carriers of the allocated set of carriers relative to the second sender device considered.

Thus, in one particular embodiment, the technique for managing communications avoids the use of additional processing means other than those implemented to set up a communication.

Advantageously, the power level of the received predetermined signal results from an addition furthermore of a power level received through at least one adjacent carrier. A carrier is said to be adjacent if it is separated by a distance smaller than or equal to an acceptable frequency error tolerance in the network relative to a carrier of the allocated set of carrier(s) allocated to said second sender device.

In this way, the discussed technique for managing communications averts the implementation of complex additional means requiring a synchronization of the frequencies of the senders to prevent interferences.

The first sender device and/or the receiver device can be configured according to a plurality of transmission configurations each enabling the implementation of said first communication. Advantageously, the step of estimating a rate of disturbance is performed for each of the configurations of said plurality of configurations.

Thus, the discussed technique for managing communications determines several configurations which can be used to set up simultaneous communications for certain second sender devices.

According to one advantageous characteristic, the method for managing comprises steps of:
  determining, for at least one transmission configuration, a number of second sender devices for which said rate or rates of estimated disturbance are below said predefined threshold;
  selecting a configuration from among said plurality of transmission configurations as a function of the determined number or numbers of second sender devices for which the estimated rate or rates of disturbance are below said predefined threshold;
  configuring the first sender device and a receiver device according to the selected transmission configuration.

Thus, in one particular embodiment, it is possible to configure the first sender device and the receiver device according to a transmission configuration enabling a maximum number of simultaneous communications to be set up.

Advantageously, the receiver device is the manager device.

Another embodiment of the disclosure pertains to a device for managing communications, a first communication being set up in said network on a plurality of carriers between a first sender device and a receiver device, said network comprising a set of at least one second sender device for which a second communication has to be established simultaneously with said first communication. Such a device for managing comprises:
  means for allocating a set comprising at least one carrier among said plurality of carriers to each second sender device, the carrier(s) allocated to each second sender being distinct;
  means for obtaining, for each second sender device, a reception power level for a predetermined signal sent by said second sender device on its respective allocated set of carrier(s);
  means for determining network communication conditions, based on the power level(s) obtained for the second sender device(s).

Advantageously, the device for managing comprises means for implementing steps that it performs in the method for managing as described here above, in any one of its different embodiments.

Another embodiment of the disclosure concerns a method for the setting up, by a second sender device, of a second communication to be set up simultaneously with a first communication set up on a plurality of carriers between a first sender device and a receiver device. Such a method comprises steps of:
  sending a predetermined signal on a set comprising at least one carrier among said plurality of carriers;
  setting up said second communication, as a function of an estimation of a rate of disturbance of the first communication, the estimation being done on the basis of an obtained level of reception power of the predetermined signal.

Advantageously, the step of setting up said second communication comprises a step of:
  obtaining an estimation of a margin of attenuation between the first communication and the second communication, on the basis of the estimation of the rate of disturbance of the first communication;
and, should the estimation of the margin of attenuation be below or equal to the predefined threshold, the second communication is set up with a sending value of power of the second sender device reduced as a function of the estimation of the margin of attenuation.

Thus, it is possible to set up the second communication or second communications while minimizing the risks of interference on the first communication.

Another embodiment of the disclosure concerns a method for identifying devices of a wireless network in which communications in between devices are set up over transmission cycles, a first communication being set up on a plurality of carriers between a first sender device and a receiver device, said network comprising a set of at least one second sender device for which a second communication has to be established simultaneously with said first communication. The method is such that a manager device performs the steps of:
  allocating a set of at least one carrier among said plurality of carriers to each second sender device, the carrier(s) allocated to each second sender device being distinct;
  allocating at least one time slot in said transmission cycles, in which the devices of the wireless network may concurrently transmit a predetermined signal on their respective allocated set of carrier(s);
  receiving a signal during said allocated time slot(s);
  identifying at least one device on the basis of said signal received and on the basis of the carrier(s) allocated to each sender device.

Thus, in this particular embodiment, it is proposed to allocate a distinct set of carriers (for example, OFDM carriers) to the network devices, just to identify each device when they communicate concurrently.

Another embodiment of the disclosure concerns a second sender device capable of setting up a second communication simultaneously with a first communication on a plurality of carriers between a first sender device and a receiver device. Such a second sender device comprises:
  means for sending a predetermined signal on a set comprising at least one carrier among said plurality of carriers;
  means for setting up said second communication, as a function of an estimation of a rate of disturbance of the first communication, the estimation being done on the basis of an obtained level of reception power of the predetermined signal.

Another embodiment of the disclosure concerns a computer-readable storage medium storing computer program comprising a set of instructions executable by a computer for implementing the above-mentioned method for managing (in any of its different embodiments).

4. BRIEF DESCRIPTION OF THE DRAWINGS

Other features and advantages of embodiments of the invention shall appear from the following description, given by way of an indicative and non-restrictive example and from the appended drawings, of which:

Figure 3:
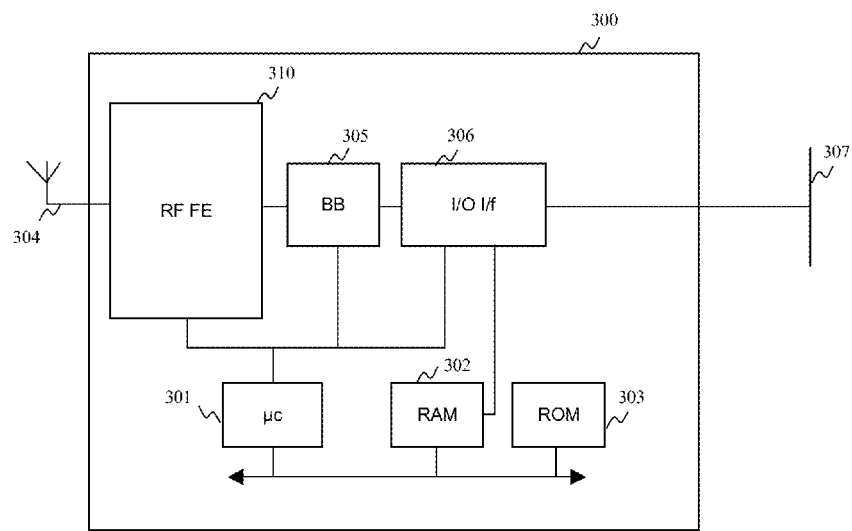
Figure 4A:
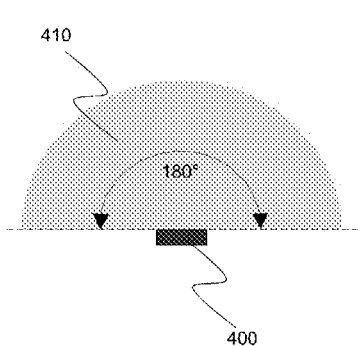
Figure 4B:
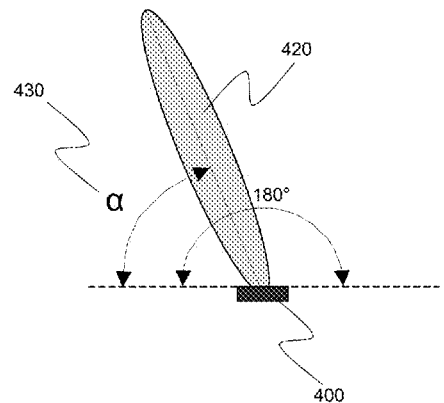
Figure 5:
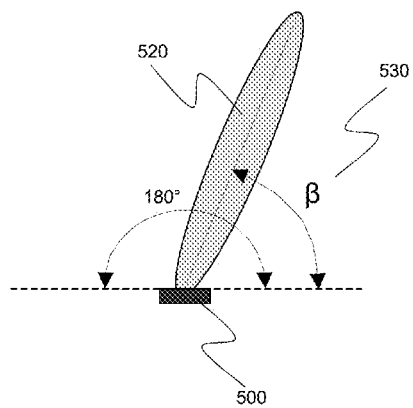
Figure 6A:
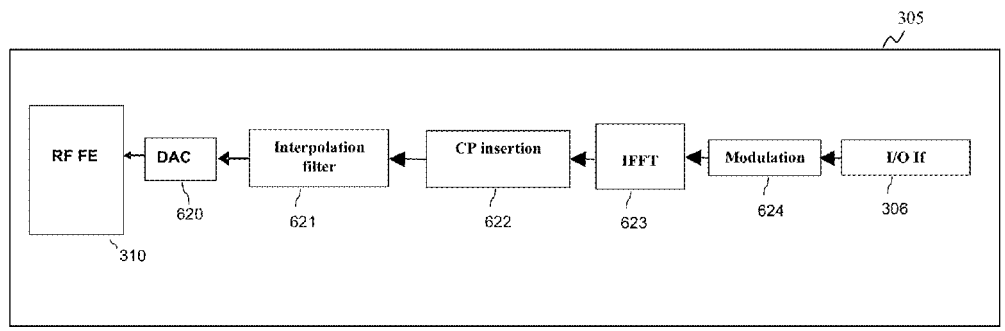
Figure 6B:
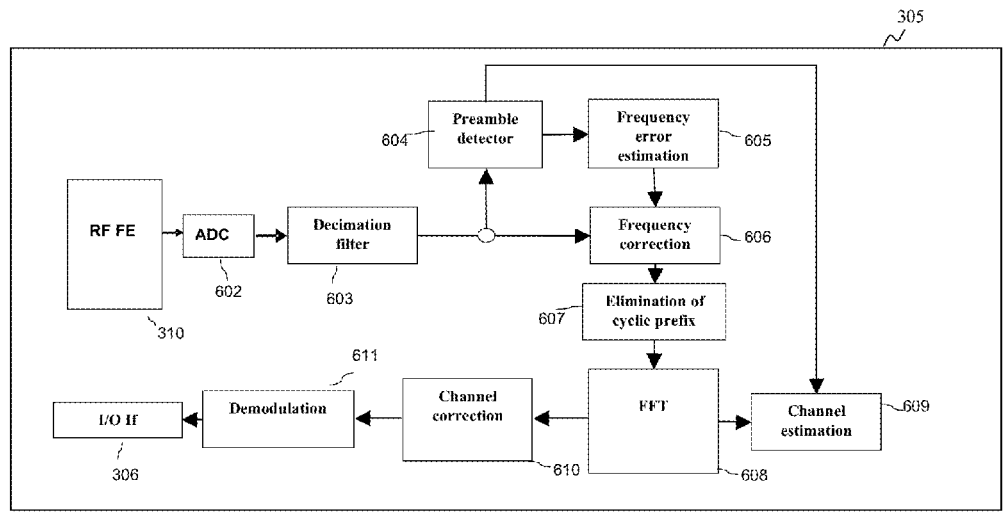
Figure 9:
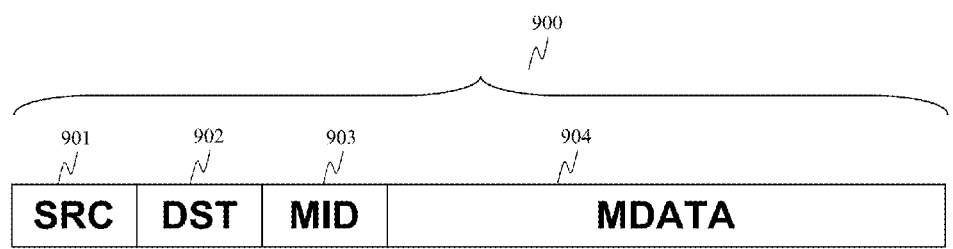
Figure 10:
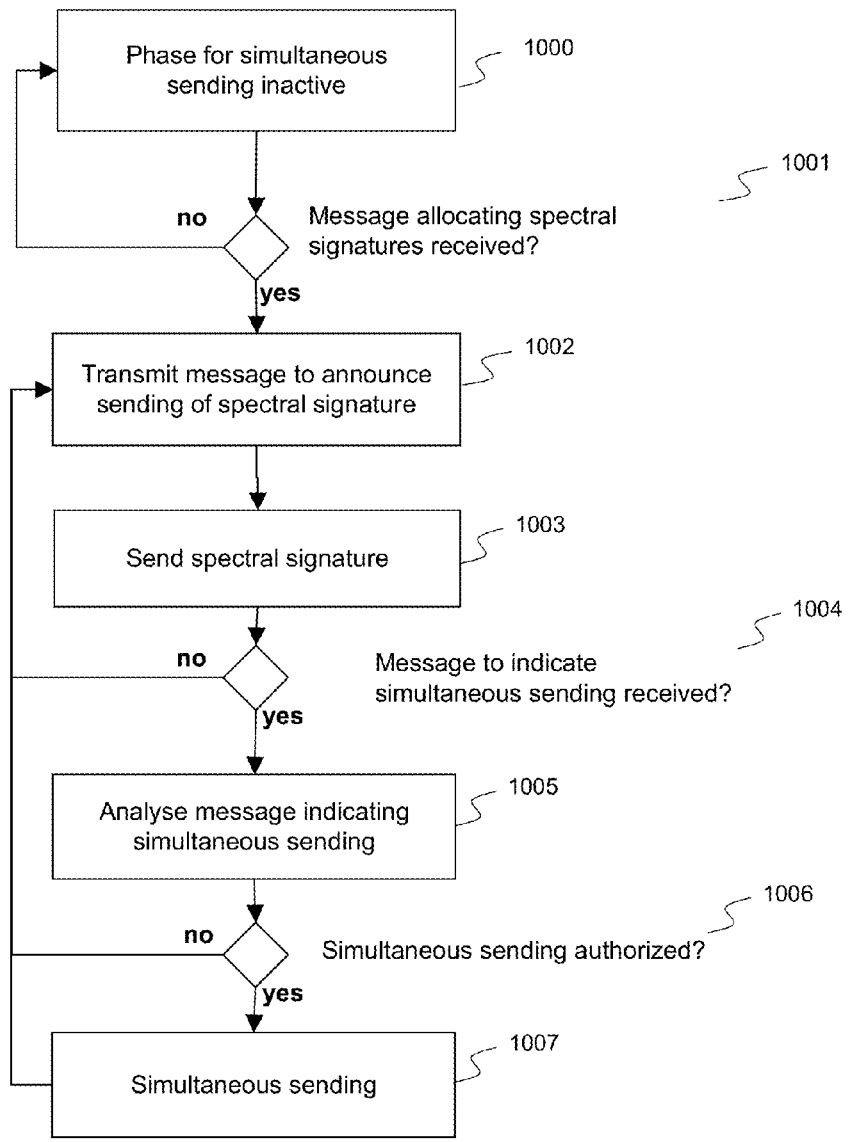
Figure 11:
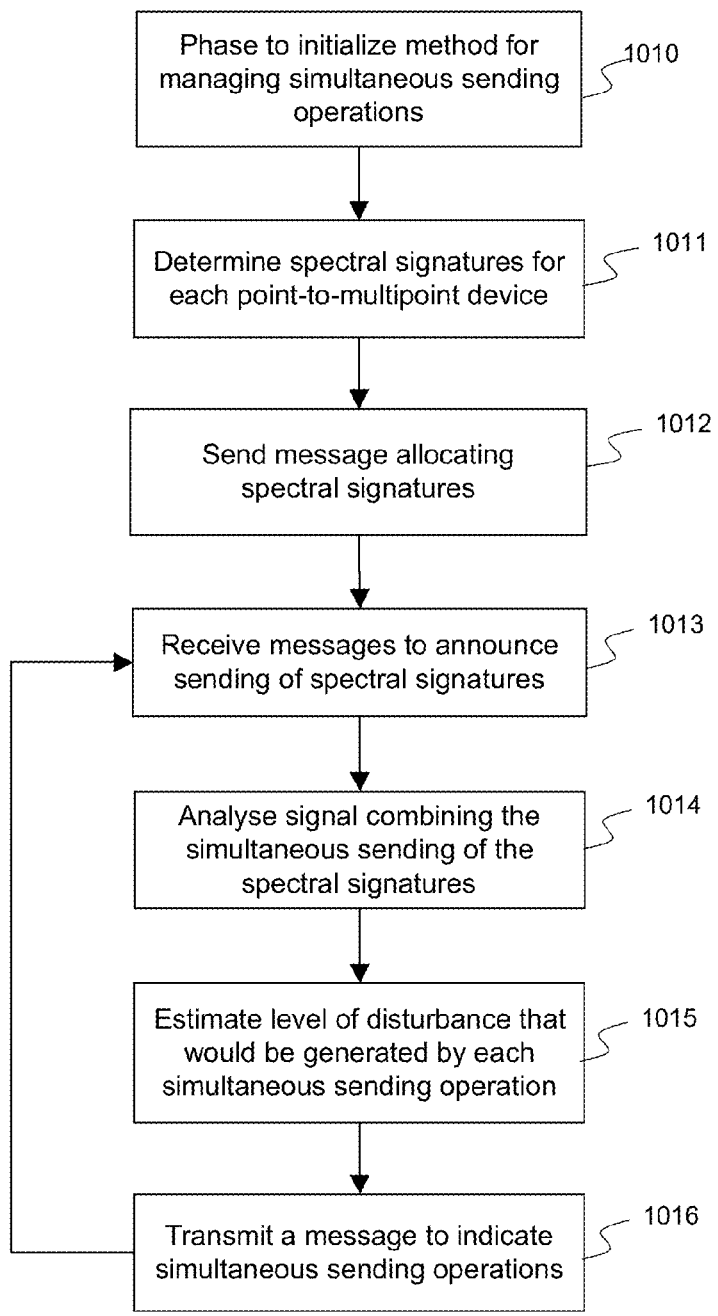

FIG. 3 presents the schematic structure of a generic communications device according to a particular embodiment;

FIG. 4a illustrates an example of a mode of operation of a sending antenna with a wide-aperture angle;

FIG. 4b illustrates an example of a mode of operation of a sending antenna with a narrow-aperture angle;

FIG. 5 illustrates an example of a mode of operation of a receiving antenna;

FIG. 6a illustrates a functional block diagram of a processing unit designed for OFDM modulation;

FIG. 6b illustrates a functional block diagram of a processing unit intended for OFDM demodulation;

FIGS. 7a and 7b provide an illustration in the form of tables of an example of the building of spectral signatures, FIG. 7a presenting an intermediate step and FIG. 7b presenting the final result of this building operation;

FIG. 8 provides an illustration in table form of the results obtained at the end of an analysis of spectral signatures according to one particular embodiment;

FIG. 9 provides a generic illustration of the structure of a data message that can be transmitted in the network to implement the method for managing communications;

FIG. 10 is a flowchart of an algorithm for setting up a second communication to be set up simultaneously with a first communication according to a particular embodiment;

FIG. 11 is a flowchart of an algorithm for managing communications according to a particular embodiment.

6. DETAILED DESCRIPTION

Figure 1:
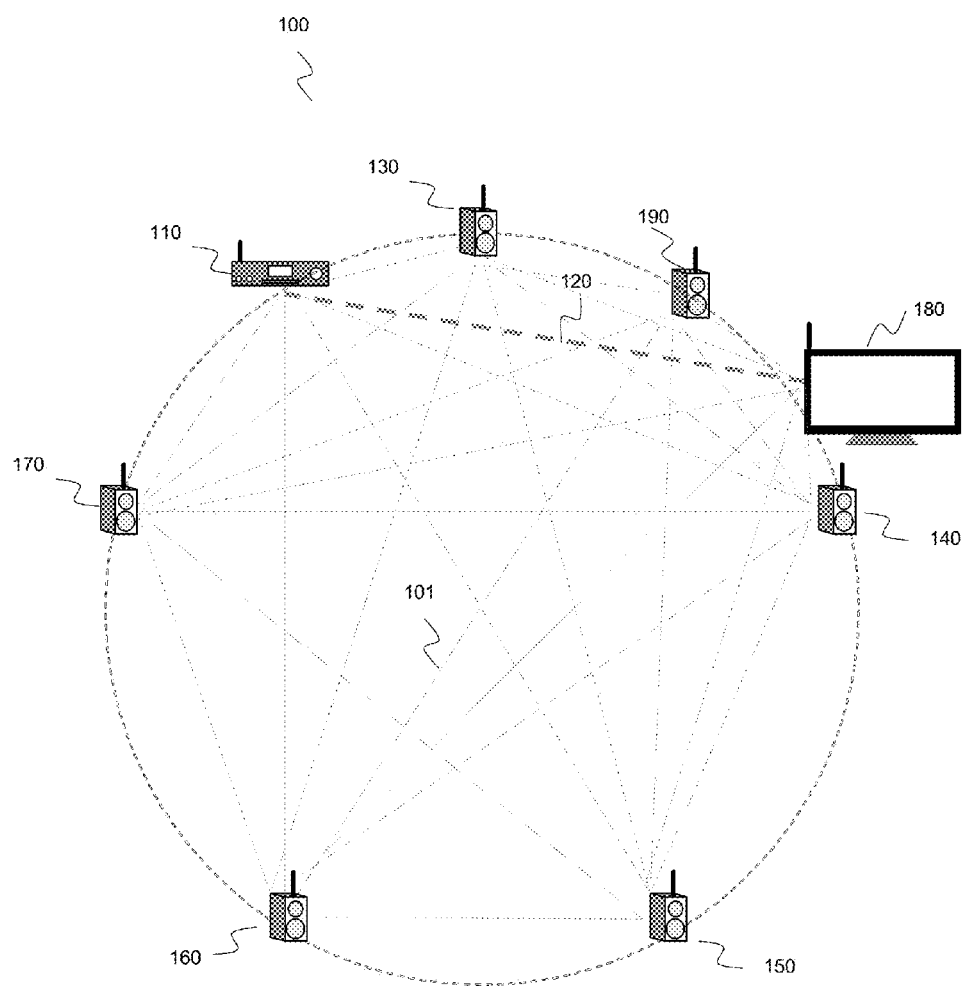
FIG. 1 illustrates an example of a wireless communications network in which it is possible to implement the methods for managing and setting up according to a particular embodiment.

FIG. 1 illustrates an example of a wireless communications network in which the methods for managing and setting up communications compliant with a particular embodiment of the invention can be implemented.

More particularly, the network 100 of FIG. 1 illustrates a wireless (5.1 home cinema type) video and audio distribution network using millimeter waves about the 60 GHz frequency band. The network 100 comprises a source device 110 in charge of the video application, a video display device 180 and a plurality of sender and receiver nodes 130, 140, 150, 160, 170 and 190 in charge of the audio application. The above-mentioned nodes of the network 100 are all interconnected by millimeter wave radio communications links 101. As illustrated, the source device 110 uses the communications link 120 to transmit video data to the video display device 180.

It is deemed to be the case that the topology of the network 100, i.e. the relative spatial position of the devices of the network, enable accurate working of the network 100.

It must be noted that the particular embodiment described here below is given by way of an illustrative example. It is clear that many other embodiments can be envisaged, without departing from the framework of the disclosure.

To transmit a stream of data pertaining to an audio stream, a video stream or a combination of the two, a protocol such as the one described by the IEEE 802.15.3 standard may, for example, be implemented. Apart from the fact that it permits very high bit rates (in its 802.15.3c version), owing to a transmission of data in the 57-64 GHz frequency band, this protocol offers to each of the nodes of the network the possibility of benefiting from a time of access to the shared wireless communications medium by using time division multiple access (TDMA) providing for a division of the time domain into cycles, here below also called a TDMA cycles (or TDMA sequence).

A data stream is formed by a plurality of data blocks and is generally protected against transmission errors by an error correction code. At the level of the sender device, the data blocks of the data stream are grouped together in packets, each packet being then encoded so as to generate a plurality of parity blocks representing redundant information. At the video display device, the received data packets are decoded. The decoding consists for example in removing the errors from the received data blocks by using the parity blocks.

Figure 2:
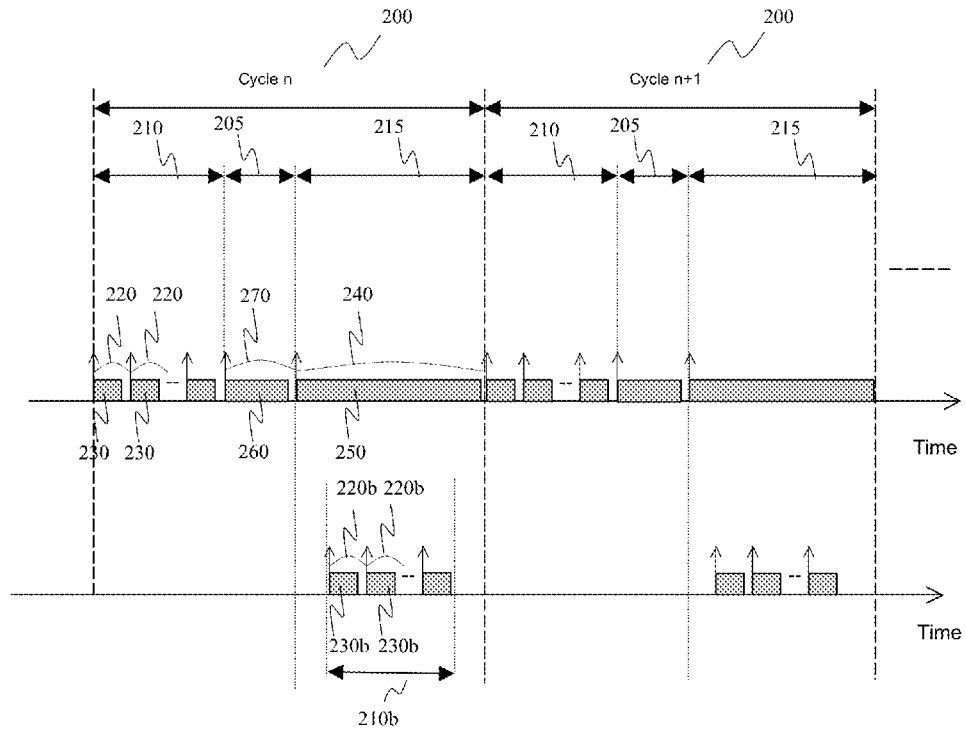
FIG. 2 illustrates an example of a synchronous physical layer using a method of time division multiple access (TDMA)

FIG. 2 illustrates an example of a synchronous physical layer using a time division multiple access (TDMA) method.

The time is divided into TDMA cycles 200. Each TDMA cycle 200 comprises:

a time slot 210 during which the point-to-multipoint type communications are implemented. The physical medium is shared in time so that each of the point-to-multipoint devices of the communications network is allocated a time slot 220 at each TDMA cycle 200 to transmit its data 230. Each time slot 220 can convey zero, one or more data blocks of the data stream as a function of the bit rate of this data stream and more generally as a function of the data to be effectively transmitted. Thus, each of these data blocks also has a corresponding transmission time slot. It can be noted that among the data blocks, whether proper data blocks or relay data blocks, there are control data blocks enabling the transmission and relaying of control messages. Each data block can itself be divided into a plurality of packets or symbols. The relay devices of the communications network furthermore re-transmit data blocks (called relayed blocks) addressed to third-party devices of the network so that, at the end of the cycle 200 (or at the end of a predetermined number of cycles 200), the data blocks received in the different time slots 220 represent different copies of the original data block. This is what is called relaying by network meshing. The transmission mode used for each time slot 220 is performed according to a quasi-omnidirectional antenna configuration (wide radiation angle). The reception mode used for each time slot 220 is done in a directional antenna configuration (narrow sensitivity or reception angle);

a time slot 215 during which a point-to-point communication is implemented involving a point-to-point sender device (for example the source device 110 described with reference to FIG. 1) and a point-to-point receiver device (for example the video display device 180 described with reference to FIG. 1). The point-to-point sender device is allocated one time slot 240 per TDMA cycle 200 to transmit its data 250 to a particular destination. The transmission mode used for a time slot 240 is performed according to a directional antenna configuration. The reception mode used for a time slot 240 is also done according to a directional antenna configuration. Naturally, several point-to-point type communications can be established successively during the time slot 215. For the sake of simplifying the description, only one point-to-point communication will be considered here below in the description;

a time slot 205 (here below also called a test time slot) during which the point-to-multipoint devices wishing to establish a communication simultaneously with the point-to-point communication link-up implemented during the time slot 215, send distinct spectral signatures 260 during a same time slot 270. These distinct spectral signatures 260 are described in detail here below with reference to FIGS. 7a and 7b. The mode of transmission used for a time slot 270 is applied in to a quasi-omnidirectional antenna configuration. The reception mode used for a time slot 270 is applied in a directional antenna configuration.

During the time slot 215, it is therefore planned to implement point-to-multipoint communications simultaneously with point-to-point communication. Indeed, and as described in detail here below with reference to FIG. 11, at the end of the test time slot 205, the point-to-point receiver device permits one or more point-to-multipoint sender devices to establish a point-to-multipoint communication simultaneously with the point-to-point communication. Thus, each point-to-multipoint sender device has a time slot 220b allocated to it in order to transmit applications or control data 230b. It can be noted that the transmission mode used for each time slot 220b is applied in a quasi-omnidirectional antenna configuration. The reception mode used for each time slot 220b is applied in a directional antenna configuration.

In one particular embodiment, the time slot 210b corresponding to the set of time slots 220b is predefined so that it is included integrally in the time slot 240. It can be noted that very frequently the start of each time slot 240 (called a "preamble" of the point-to-point communication) corresponds to the most sensitive part of the point-to-point communication 215. This is why this part should preferably not be used simultaneously with other communication associated with a time slot 220b. Thus, the fact of not using the most sensitive part of the point-to-point communication for a time slot 220b minimizes the errors of false detection of a start of a packet or transmission channel estimation errors during the phase for synchronizing the point-to-point receiver device.

By way of an illustrative example, it may be deemed to be the case that this time slot, during which the implementing of time slot(s) 220b is not done (here below they are called prohibited time slot) represents 10% of the time slot 240 reserved for the point-to-point transmission 215.

The time allocated to this prohibited time slot is used in order to make:
an estimation of the transmission channel;
an estimation of the frequency errors existing between the point-to-point sender and receiver devices of the network.

Thus, it is made sure that the time needed for synchronizing the point-to-point receiver device with the transmission of the point-to-point sender device is respected. This prevents interferences, related to any communication established in parallel with the point-to-point communication, that give rise to errors in the determining of the synchronization parameters in reception that are difficult to correct. Once the transmission time of the preamble of the point-to-point communication has elapsed, the payload data is transmitted; the errors caused by interference related to a communication established in parallel with the point-to-point communication can then be corrected through the use of an error correction code.

FIG. 3 shows the schematic structure of a generic communications device 300 of the communications network 100 implementing the method for configuring according a particular embodiment.

More specifically, the generic communications device 300 may be the source device 110, one of the sender devices, one of the receiver devices (120, 130, 140, 150, 160, 170) or one of the relay devices of the communications network 100.

The generic communications device 300 comprises:
a RAM (Random Access Memory) 302 working as a main memory;
a computation block 301 (denoted μc for "micro-controller") or CPU (Control Process Unit) whose capacity can be extended by an optional random-access memory connected to an expansion port (not shown in FIG. 3). The CPU 301 is capable of executing instructions from the ROM 303 when the communications device 300 is powered on. After the system has been powered on, the CPU 301 is capable of executing instructions from the RAM 302 pertaining to a computer program, once these instructions have been loaded from the ROM 303 or an external memory (not shown in the present FIG. 3). A computer program of this kind, if executed by the CPU 301, prompts the execution of a part or of the totality of the steps of the algorithms described here below with reference to FIGS. 10 and 11.
a block 310 (denoted RF-FE or RF front-end) responsible for matching the output signal from a baseband unit 305 (RF-BB or RF-baseband) before it is sent out by means of an antenna 304. For example, the matching can be done by frequency transposition and power amplification processes. Conversely, the unit 310 also enables the matching of a signal received by the antenna 304 before it is transmitted to the baseband unit 305. The baseband unit 305 (here below also called a "processing unit" is responsible for modulating and demodulating the digital data exchanged with the unit 310. It contains an OFDM modulator and an OFDM modulator).
an input/output interface (I/O I/f) unit 306 connected to a communications network 307.

FIGS. 4a and 4b each illustrate an example of a sender antenna 400, FIG. 4a illustrating a sender antenna configured quasi-omnidirectionally and FIG. 4b showing a sender antenna configured directionally (or selectively).

In the example of the communications network 100 of FIG. 1, the sender antennas 400 may be configured either in a wide radiation angle 410 (in this case the term used is quasi-omnidirectional sender antenna configuration) or with a narrow radiation angle 420 (in this case the term used is directional sender antenna configuration).

In this case, each sender node of the network implements a technique of beamsteering and beamforming. Indeed, an increase in the power of the signal in a desired direction can be obtained by reducing the width of the radiation angle in sending mode, thus making it possible either to increase the sending distance or, for equal distances, to increase the signal-to-noise (SNR) ratio for a targeted receiver node. Such a technique thus makes it possible to improve radio signal reception quality and reduce the error rate of the transmission channel.

The orientation of the narrow radiation beam 420 is shown with an orientation angle α 430. This orientation angle α is chosen from amongst a set of possible antenna orientation angles in the maximum radiation zone 410 of the antenna 400. In other words, the angle of orientation α can take any angle value ranging from 0 degrees to 180 degrees.

FIG. 5 illustrates an example of a mode of operation of a receiver antenna 500.

In the example of the communications network 100 of FIG. 1, the receiver antennas 500 (which can correspond to the antennas 400 if one and the same antenna is used in sending and in receiving) are always configured (i.e. whatever the mode of transmission implemented) with a narrow reception angle 520 (in this case the term used is "directional configuration of receiver antenna). Indeed, as explained here above, the use of a narrow reception angle 520 either increases the power of the radio signal at input of the receiver device (positive gain), thus increasing the distance of transmission or, for equal distances, increases the signal-to-noise ratio (SNR). The radio signal reception quality is thereby improved and the error rate of the transmission channel is reduced.

The orientation of the directional major lobe 520 of the receiver antenna 500 is represented by an orientation angle β 530. This angle β is selected from a set of possible antenna orientation angles belonging to the zone of maximum sensitivity of the antenna 500. In other words, the orientation angle β may take any value of an angle ranging from 0 degrees to 180 degrees.

Referring now to FIG. 6a, a functional block diagram is presented of a processing unit designed for OFDM modulation.

Preferably, all the devices of the network 100 communicate by using an OFDM (Orthogonal Frequency Division Multiplexing) type modulation implemented by the processing unit 305 (illustrated in FIG. 3).

Using data received from the interface 306, the processing unit 305 carries out a modulation on several orthogonal carriers using a classic transmission sequence consisting of a primary modulator block 624 which is responsible for successively modulating a given number of pieces of data on each of the orthogonal carriers implemented. The modulated pieces of data are then transmitted to an IFFT (Inverse Fast Fourier Transform) block 623 performing a conversion of these pieces of data from the frequency domain into the time domain (in the form of discrete data) to form an OFDM symbol. The OFDM symbol is complemented by a cyclic prefix using a cyclic prefix (CP) insertion block 622 in order to combat inter-symbol errors. The symbols thus formed are then transmitted to the RF FE block 310 responsible for frequency transposition after having undergone an interpolation filtering, through the block 621, and a digital/analog conversion, through the DAC (Digital to Analogue Converter) block 620.

It must be noted that the first OFDM symbols transmitted are predefined (with a predefined number) and constitute the preamble needed by the processing unit 305 of a receiver device to determine the reception and synchronization parameters enabling the activation and implementation of the demodulation functions: frame detection, frequency offset correction, gain control or automatic gain control (denoted AGC) and transmission channel error correction.

At the time slots 220, 220b, and 240, all the carriers predefined to implement communications in the system are used by the transmission sequence. A subset of these carriers is used during the time slot 270 according to an allocation of carriers as described here below with reference to FIGS. 7a, 7b and 8.

FIG. 6b illustrates a functional block diagram of processing unit designed for the OFDM demodulation.

The data signal received from the RF FE block 310 is first of all converted into a digital signal by means of an ADC (analog-to-digital converter) block 602 and then filtered by means of a decimation filtering block 603. Upon detection of a preamble by the block 604, the processing unit 305 launches an analysis of this preamble in order to estimate the existing frequency error between the transposition unit 310 of the sender device and that of the receiver device through the block 605. On the basis of this estimation, a correction of the frequency error is then applied to the entire data signal received by means of the block 606. The block 607 takes in charge the elimination of the cyclic prefixes of the signal in order to constitute the OFDM symbols for the FFT (Fast Fourier Transform) block 608. Then the block 609 carries out an estimation of the transmission channel, this estimation being used as a basis for applying a correction of the transmission channel error 610 to all the symbols to which the fast Fourier transform (FFT) had been applied. At output of the block 610, the resulting modulated data stream is transmitted to a primary demodulator block 611. The initial data stream is then reconstituted at the data interface level 306.

In the description associated with the FIGS. 6a and 6b here above, it must be noted that only the part relating to the processing of the signal needed for the operation of the method for managing communications (especially the generation and analysis of spectral signatures) is explained. It is clear that those skilled in the art could easily complement the transmission and reception channel, for example by introducing data protection means (through the use of an interlacing and concatenated application of a convoluted code (for example a convoluted code according to the Viterbi algorithm) or a block code (for example a Reed-Solomon type correction code) for example) or means for improving the frequency error correction (by the use of specific carriers, called drivers for example).

FIGS. 7a and 7b illustrate an example, in the form of tables, of a building of spectral signatures, FIG. 7a presenting an intermediate step and FIG. 7b presenting the final result of this building operation.

It may be recalled that it is proposed a mode of simultaneous transmission in which one or more sender devices are allowed to set up point-to-multipoint communications in a time slot 210b implemented simultaneously with the time slot 215 reserved for point-to-point communication.

This simultaneous mode of transmission therefore makes it possible, for example, to increase the number of re-transmissions of data, in addition to the redundancy of transmissions already implemented systematically in a point-to-multipoint transmission mode during the time slot 210. Thus, in the context of the implementation of net meshing, an increase in the number of copies of a same set of pieces of data received by a destination device can be ensured. In general and on the whole, the bandwidth of the network is increased.

In order to check whether the point-to-multipoint devices can be allowed to set up another point-to-multipoint communication during the point-to-point transmission, it is necessary to be able to permit the generation, by each point-to-multipoint device, of a particular signal here below called a spectral signature which can be identified and analyzed by the point-to-point receiver device despite a simultaneous transmission of all the spectral signatures.

A spectral signature is a radio signal, unique to each point-to-multipoint device, defined by a set of one or more carriers. These carriers are allocated according to the following rules:
  the carriers allocated to a spectral signature are chosen from a plurality of carriers defined by the system and used to establish each communications in the network. The allocated carriers are selected from among all the carriers used to establish each OFDM communications in the network;
  the distance between two carriers respectively assigned to two different spectral signatures is at least greater than or equal to the following expression:

$$2\times[(\text{integer value below of Fe})+2] \quad (1)$$

with Fe being the maximum acceptable radio frequency error defined by the network.

This frequency error corresponds to the error that must be corrected by the OFDM demodulator 305 by means of the block 606 as illustrated in FIG. 6*b*.

Here below, D will denote this minimum distance.

Thus, whatever the frequency error associated with each sender device, the radio signal resulting from the simultaneous sending of the spectral signatures of the set of sender devices during the time slot 270 is likely to show little (or no) interference owing to the creation of this deliberate distance (D) between each spectral signature. Thus, even if a spectral signature has undergone a frequency drift during transmission, this drift will in no case cause an overlapping between two spectral signatures.

It must be noted that the notion of distance corresponds to the number of carriers between two carriers. This distance is normalized to one unit corresponding to the frequency offset between two neighboring carriers. The frequency error Fe is normalized zed in the same way.

In the context of a 60 GHz communications system, for example, for which the maximum frequency error is defined at Fe=40 ppm (for parts per million) at the receiver device and the OFDM modulation is based on IFFT/FFT transforms with 512 carriers sampled at 2.538 Ghz, then each carrier can in this case undergo a frequency offset equal to:

60 Ghz×40 ppm=2.4 Mhz.

The frequency offset between each carrier and its neighboring carrier is equal to:

2.538 Ghz/512=4.957 Mhz, and the standardized frequency error Fe is therefore equal to:

2.4 Mhz/4.957 Mhz=0.484.

In taking the expression (1), we therefore obtain a minimum distance D equal to 4.

Here below, a method is explained for building spectral signatures with reference to FIG. 7*a* (intermediate result) and 7*b* (final result). It is clear that this is not a unique method but a purely illustrative example explaining the mechanism of distribution of the spectral signatures. This method is aimed at uniformly distributing each allocated set of carriers for the time slot 270 on the spectrum covered by all the carriers used for the OFDM communications in the system. The goal here is to define spectral signatures that are the most possible representative of the entire spectrum covered by the set of carriers used for the OFDM communications in the system.

Furthermore, this method is aimed at allocating a substantially identical number of carriers to each set of carriers allocated for the time slot 270. Thus, the power potentially received coming from each sender device to which a set of carriers has been allocated for the slot 270 is substantially identical (therefore easily comparable), thus making it possible to determine the contribution of each of the sender devices in the signal received during the time slot 270.

The following elements are defined:

let $P_1$ to $P_n$ be the set of carriers of the radio band used to establish each communications in the network. These usable carriers are represented in order throughout the radio frequency spectrum, i.e. from the beginning to the end of the spectrum, in rising or descending order;

let $S_1$ to $S_k$, be the set of spectral signatures to be defined for an allocation to the point-to-multipoint devices.

Iteratively, the first carrier $P_1$ is assigned to the first spectral signature. The next carrier $P_{i+1}$ situated at a distance D is assigned to the following signature $S_{j+1}$. When the signature $S_k$ is reached, the next carrier is then assigned again to the first spectral signature $S_1, \ldots$ Thus, whenever the signature $S_k$ is reached, the assigning of the carriers is done incrementally with $S_1$, and this is done until all the usable carriers have been used.

FIGS. 7*a* and 7*b* more particularly illustrate the case of application of a communications system for which the maximum frequency error is Fe=0.8, the number of carriers is 352, the minimum distance is D=4, and for which it is sought to generate eight spectral signatures (for example managing simultaneous communications for the eight devices of the communications network 100 of FIG. 1). It must be noted that the last column of the table illustrated in FIG. 7*a* cannot be used because the maximum number of carriers defined by the system is exceeded.

In order to harmonize the distribution of the carriers, the entire allocation is centered on half the difference between the index (i) of the last assigned carrier and the maximum number of assignable carriers. The result of such a re-arrangement is illustrated in FIG. 7*b*. The set of carriers has been offset by one carrier in order to obtain eight exploitable spectral signatures.

Referring now to FIG. 8, we present the results obtained at the end of an analysis of spectral signatures according to one particular embodiment.

After allocation of the spectral signatures, any device having a time slot 220*b* available (reserved for the simultaneous transmission mode) repetitively transmits its spectral signature during the test time slot 270. In other words, each of these devices continuously sends its spectral signature for a predefined number of times during the test time slot 270. All the devices concerned by this test thus simultaneously send their respective spectral signatures.

The process of transmission of a spectral signature is deliberately implemented in a redundant and continuous way during a same time slot in order to guaranty to the point-to-point receiver device (responsible for analyzing the spectral signatures) the presence of a time window that is sufficiently extended to allow it to make an analysis of all the spectral signatures sent by the point-to-point devices.

We recall that this test time slot 270 makes it possible to know which are the devices capable of setting up another communication (point-to-multipoint communication) during the time slot 215 reserved for point-to-point communications.

To this end, on the basis of the indices of the carriers allocated to each point-to-multipoint device to generate a spectral signature, the transmission sequence of the OFDM modulator 305 is used in a simplified mode of operation. A series of binary digits is generated at the input of the primary modulator 624, each binary digit (0 or 1) corresponding to the allocation status of the carrier expected by the IFFT transformation unit 623. Arbitrarily, it is assumed that the value 1 corresponds to an allocated carrier and that the value 0 corresponds to a non-allocated carrier. Thus, the primary modulator 624 generates or does not generate any carrier depending on the allocation status of the carrier.

An OFDM symbol is thus generated at the output of the IFFT transformation unit 623, this symbol being constituted by the carrier or carriers allocated to the concerned device. This process is generated redundantly in order to generate the same symbol several times during the time slot 270.

It must be noted that the CP insertion unit 622 is not used in this case because the OFDM symbols thus generated cannot interfere with each other because they are identical.

It must also be noted that the value 1 is given by way of an indication and may necessitate a normalization by a gain in function of the implementation choice and of the use of the OFDM modulator or in function of any other parameter that those skilled in the art might deem relevant.

During the test time slot 270, the point-to-point receiver device carries out an analysis of the signal resulting from the superimposition of the set of spectral signatures sent simultaneously. More specifically, knowing the start and the duration of the test time slot 270 (with its value predefined by the system), the point-to-point receiver device makes this analysis only on a part of the time slot ensuring it that all the point-to-multipoint devices are in the process of simultaneously sending their respective spectral signatures. For example, the point-to-point receiver device carries out its analysis after 50% of the time slot 270 has elapsed and for a duration of at least one OFDM symbol.

This analysis must be made with the same radio configuration parameters (for example the same receiver antenna parameters) as those determined for setting up communication during the time slot 240.

If the point-to-point receiver device have dynamic adaptation means available (for example means for determining receiver antenna parameters by scanning or automatic gain control (AGC) means) capable of making variations in this spectral analysis, the receiver device configures these dynamic adaptation means with the configuration used during the time slot 240 of the previous TDMA cycle.

For example, if the point-to-point receiver device has an automatic gain control (AGC) mechanism available, this mechanism is deactivated and the device configures the value of the gain to be adopted with the value used during the time slot 240 of the previous TDMA cycle.

To make this analysis, the point-to-point receiver device uses the reception sequence of its OFDM demodulator 305 in a simplified mode of operation. The blocks 604, 605, 606, 607, 610 611 corresponding respectively to the preamble detection, frequency error estimation, frequency correction, CP suppression, transmission channel correction and primary demodulation units are then not used. The OFDM demodulator 305 uses simply the FFT transformation unit 608 and the channel estimation unit in order to determine the power of each carrier constituting the signal. This function corresponds to a spectral analysis.

In one particular embodiment, this analysis is performed on at least one portion of the signal corresponding to a duration of an OFDM symbol as defined by the system for communicating.

In one alternative embodiment, this function can be applied to several portions of the signal corresponding to several successive OFDM symbols or independent symbols during the test time slot and an average can then be taken of the results obtained.

FIG. 8 provides an illustration by way of an example of the results of a spectral analysis of the signal combining a set of eight spectral signatures sent simultaneously during the test time slot 270. The result of this spectral analysis corresponds to a table containing, for each carrier received, a power level measured by the point-to-point receiver device.

On the basis of the result of this spectral analysis, the point-to-point receiver device is responsible for estimating, for each point-to-multipoint device, the level (or rate) of disturbance on the point-to-point communications established during the time slot 215 which would be generated by the implementation of a point-to-multipoint communication established during a time slot 210b.

With the different spectral signatures allocated to the point-to-multipoint devices being known, the point-to-point receiver device is capable of determining the power level received for each of these spectral signatures. The point-to-point receiver device furthermore takes account of the frequency error generated by the transmissions of each spectral signature.

As explained here above, by construction, the spectral signatures are unique and use carriers that are sufficiently spaced out relative to each other so as not to interfere. The point-to-point receiver device assigns each analyzed carrier to a spectral signature and especially assigns each analyzed carrier to a point-to-multipoint device that has sent this signature.

For a given spectral signature, the point-to-point receiver device selects the carriers assigned to this signature as well as the adjacent carriers. An adjacent carrier is by definition separated from another carrier associated with the same signature by a distance smaller than or equal to the integer value greater than the maximum frequency error Fe.

The point-to-point receiver device determines a carrier selection as well as the corresponding power levels for each sender device.

The point-to-point receiver device determines an apparent power level for each device of the sender.

In one particular embodiment, the apparent power level of a sender device is equal to the maximum value of the carrier selection power.

In another particular embodiment, the apparent power level of a sender device is equal to the average value of the carrier selection power.

The point-to-point receiver device therefore determines, for each sender device, the apparent power level. A disturbance level (which would be generated on the point-to-point communications 215) is then estimated as a function of the apparent power level for each spectral signature. This disturbance level is equal to the difference between the nominal power received during the point-to-point communication 215 and the apparent power of the other sender devices.

In one particular embodiment, the nominal power of a sender device received by a receiver device is equal to the average of the power of the set of carriers. This function is performed for example by an FFT transformation (by means of the block 608) and an estimation of transmission channel (by means of the block 609).

Those skilled in the art will if necessary perform a normalization of the nominal power and the apparent power level as a function of the embodiment.

Thus, during the test time slot 205, the point-to-point receiver device then estimates a margin of attenuation between its point-to-point communication and each point-to-multipoint communication capable of being established simultaneously with the point-to-point communication. This margin of attenuation corresponds to the difference between a noise level acceptable for the point-to-point communication and the estimated level of disturbance. The acceptable noise level is a value dependent on the modulation and correction codes used to establish the point-to-point communication.

A typical value of acceptable noise level equal to 20 dB may be considered for example in the case of a 16-QAM type primary modulation and a ⅔ convoluted code associated with a block corrector code.

This value must also be standardized as a function of characteristics of the point-to-point communications.

If the margin of attenuation is strictly positive for a point-to-multipoint device, it can be deemed to be the case that communication by this point-to-multipoint device during the time slot 220b, simultaneously with the point-to-point communication, is authorized. If this margin of attenuation is negative or zero, communication by this point-to-multipoint device during the time slot 220b, simultaneously with the point-to-point communication, is not authorized.

Thus, the management of simultaneous communications is implemented by the point-to-point receiver device which authorize or does not authorize each point-to-multipoint sender device, individually, to establish a point-to-point communication 220b simultaneously with the point-to-point communication link 215.

Advantageously, this management relies on an exchange of messages (as illustrated here below with reference to FIG. 9) implemented during the point-to-multipoint transmission mode 210. It thus relies on the robustness of this mode of communication.

FIG. 9 provides a generic illustration of the structure of the data messages 900 exchanged between devices of the network for implementing the method for managing communications.

Each message 900 more particularly comprises:
- a field 901 (denoted SRC for source) which corresponds to the identifier of the device that has sent the message;
- a field 902 (denoted DST for destination) which corresponds to the identifier of the destination device of the message. This field may also contain a piece of information indicating that the message is intended for all the devices;
- a field 903 (denoted MID for message identifier) which corresponds to the identifier of the message. This field includes a predefined value specifying the structure of the data elements 904 contained in the message 900;
- a field 904 (denoted MDATA for message data) which corresponds to the contents of the message 900.

The structure of the data message represented in FIG. 9 can be applied to any type of message exchanged during the point-to-multipoint transmission mode 210 to implement the method for managing communications, namely:
- a message for allocating spectral signatures enabling each sender device to obtain its unique spectral signature. Such a message is more specifically one in which:
  - the identifier of the device that has sent the message is that of the point-to-point receiver device responsible for managing simultaneous communications;
  - the identifier of the destination device is a piece of information indicating that this message is intended for all the devices;
  - the identifier of the message is a predefined value corresponding to the structure of the data of the message allocating spectral signatures;
  - the content of the message is a series of pieces of data successively comprising an identifier of the device, followed by an allocation of carriers (value 1 or 0) forming a spectral signature (according to the principle illustrated further above with reference to FIG. 8).
- a message announcing a sending of a spectral signature enabling the point-to-point receiver device to know, for each point-to-multipoint device, whether a spectral signature will be sent during the test time slot 270, and to reference the configuration of antennas used in sending mode (quasi-omnidirectional antenna or selective gain antenna). Such a message is more specifically such that:
  - the identifier of the device that has sent the message is that of the point-to-multipoint device designed to send its spectral signature throughout the time slot 270;
  - the identifier of the destination device is that of the point-to-point receiver device responsible for managing simultaneous communications;
  - the identifier of the message is a predefined value corresponding to the structure of the data of the message announcing the sending of the spectral signature;
  - the content of the message comprises a Boolean value indicating whether the sending of spectral signature will take place as well as a referencing value for referencing the antenna configuration in sending mode which will be used during the test time slot 270. This referencing value enables the point-to-multipoint device, seeking to send simultaneously during the point-to-point transmission 215, to know the antenna configuration that has been tested by the device responsible for analyzing spectral signatures during the test time slot 270 and thus be able to again use this antenna configuration during the simultaneous transmission time slot 210b. The antenna configuration corresponds especially to the transmission antenna parameters and to the transmission gain used during the test time slot 270.
- a message indicating simultaneous sending by which each point-to-multipoint sender device can obtain authorization to send simultaneously during the point-to-point transmission 215 and to know which antenna configuration has to be adopted. Such a message is more specifically a message such that:
  - the identifier of the device that has sent the message is that of the point-to-point receiver device responsible for managing simultaneous communications;
  - the identifier of the destination device is a piece of information stating that this message is intended for all the devices;
  - the identifier of the message is a predefined value corresponding to the structure of the data of the message indicating simultaneous sending;
  - the content of the message is a series of pieces of data successively containing a device identifier followed by a Boolean value authorizing simultaneous sending (value 1 or 0: authorized or non-authorized), and then a value for referencing the antenna configuration that had been used during the test time slot 270 (value contained in the message announcing the sending of a spectral signature), and finally a value representing the estimated margin of attenuation (according to the principle illustrated further above with reference to FIG. 8).

It must be noted that other messages can be exchanged between the different devices of the network during the time slot 210 such as, for example, messages aimed at declaring a stop by a device of the use of a time slot 220b or again messages aimed at ordering a stopping, by a user device, of a time slot 220b or again messages aimed at ordering the stopping, by the point-to-point receiver device, of the use of the time slot 220b (in the event of a change in conditions of transmission in the network for example), etc.

Here below, a description is given of exchanges of messages according to one particular embodiment.

A first phase corresponds to the initializing of the simultaneous transmission mode. The point-to-point receiver device in charge of the management of simultaneous communications sends a message for allocating spectral signatures at each change in configuration of the TDMA access mode. This may be the case for example during the introduction of a new apparatus calling for a re-configuration when the network is started.

By default, when this new apparatus is initialized or upon reception of a message indicating the introduction of this new apparatus, the other devices are not authorized to send during the time slots 220b reserved for the simultaneous transmission mode.

A second phase corresponds to the dynamic management of the simultaneous transmission mode.

Before sending its own spectral signature, each point-to-point device sends a message, during the point-to-point communications mode 210 of a TDMA cycle (n), announcing the sending of its spectral signature to the point-to-point receiver device. Then it sends its spectral signature during the test time slot 270 of this same TDMA cycle (n).

At the next TDMA cycle (n+1) and upon reception of the message indicating simultaneous sending transmitted by the point-to-point receiver device, each point-to-multipoint device determines whether it is authorized to use the time slot 220b and, if so, with what sending antenna configuration.

The point-to-point receiver device collects all the messages announcing spectral sending during the point-to-multipoint communications mode 210 of the TDMA (n) cycle. It then captures and analyses the signal coming from the simultaneous sending operations during the test time slot 270 and then, for each point-to-multipoint device and, from this, deduces the level of disturbance on the point-to-point communications that could be caused by the implementation of a simultaneous sending operation during the time slot 210b.

In the following TDMA cycle (n+1), the point-to-point receiver device sends a message indicating simultaneous sending operations comprising, for each point-to-multipoint device, authorization to send in a time slot 220b, the estimated margin of attenuation of the generated disturbance as well as the referenced antenna configuration.

Referring now to FIG. 10, we present a flowchart of a simultaneous communications control algorithm implemented by a point-to-multipoint device according to a particular embodiment.

This algorithm is aimed at controlling simultaneous communications set up during a time slot 220b (simultaneous transmission mode) for a given point-to-multipoint device.

At a step 1000, the phase for initializing the simultaneous transmission mode is not activated.

Upon reception of a message for allocating spectral signatures (step 1001), the point-to-multipoint device sends a message announcing the sending of its own spectral signature at a step 1002. Then, at a step 1003, the point-to-multipoint device sends it spectral signature.

The steps 1001 to 1002 take place during the time slot reserved for the point-to-multipoint transmission mode 210 and the step 1003 takes place during the test time slot 270, with all the above-mentioned steps taking place during a first TDMA transmission cycle 200 (n).

Upon reception of a message indicating simultaneous sending (step 1004), the point-to-multipoint device analyses this message in a step 1005 and then, in a step 1006, determines whether it is authorized or not to send during a time slot 220b reserved for the simultaneous transmission mode 210b for the next TDMA cycle 200 (n+1).

If the point-to-multipoint device is authorized, the step 1007 is executed. If not, it again performs the previous step 1002 in which a message announcing a sending of a spectral signature is sent during the time slot 210.

At the step 1007, with the point-to-multipoint device being authorized to send data simultaneously, this device uses the sending antenna configuration referenced in the message indicating simultaneous sending received at the step 1004 in order to determine the antenna parameters that it must adopt (quasi-omnidirectional or directional configuration, gain) to set up a simultaneous communication during the time slot 220b.

At a step 1007, the point-to-multipoint device implements a simultaneous communication, i.e. a communication simultaneously with the point-to-point communication 215 during the time slot 220b planned in the time slot 210b.

In one alternative embodiment, on the basis of the estimated margin of attenuation also indicated in the message indicating simultaneous sending, the point-to-multipoint device, if it is able to reduce its sending power correspondingly and by using the antenna configuration referenced in this message, can allow itself to send in its time slot 220b. In this case, the point-to-multipoint device should not take account of the prohibition given by the message indicating simultaneous sending. In this case, the step 1006 of the managing algorithm is no longer required and the step 1007 is then directly performed.

Referring now to FIG. 11, we present a flowchart of an algorithm for managing simultaneous communications implemented by a point-to-point receiver according to a particular embodiment.

This algorithm is aimed at managing all the simultaneous sending operations set up by the point-to-multipoint devices of the network.

At a step 1010, the phase for initializing the simultaneous transmission mode is activated.

At a step 1011, the point-to-point receiver device determines a unique spectral signature for each point-to-multipoint device of the network, this unique spectral signature being formed by a set of one or more carriers (preferably chosen from among all the carriers implemented by the network to set up a communications).

At a step 1012, the point-to-point receiver device sends a message for allocating spectral signatures to all the point-to-multipoint devices, each of these devices having a unique spectral signature allocated to it.

At a step 1013, the point-to-point receiver device receives the messages announcing the sending of spectral signatures sent by the different devices of the network.

The above-mentioned steps 1011 to 1013 are implemented during the point-to-multipoint transmission mode during a first TDMA transmission cycle 200 (n).

Then, at a step 1014, during the test time slot 270, the point-to-point receiver device analyses the signal coming from the set of spectral signatures sent simultaneously and from this, at a step 1015, deduces the disturbance rate that would be generated by each simultaneous transmission on the point-to-point communication during the time slot 210b (for the next TDMA cycle (n+1)).

At a step 1016, at the time slot 210 of the next TDMA cycle 200 (n+1), the point-to-point receiver device sends a message indicating simultaneous sending operations to the other devices of the network telling each point-to-multipoint device whether it is authorized to send simultaneously during its time slot 220b and which is the antenna configuration by which this result has been obtained. It also transmits the value of the margin of attenuation estimated during the analysis of the spectral signatures, which may enable a point-to-multipoint device, in taking account of this value, to adapt its power to the simultaneous sending of its pieces of data during the time slot 210b.

The disclosure provides a technique for managing communications that makes it possible to rapidly and efficiently determine the possibility (especially by limiting the necessary network resources) of setting up one or more simultaneous communications in a network in order to optimize the use of the bandwidth.

The disclosure proposes, in at least one embodiment, a technique of this kind for taking a swift decision even when one or more devices (for example six devices) wish to set up or establish simultaneous communications.

The disclosure proposes, in at least one embodiment, a technique of this kind for setting up or establishing communications simultaneously with an existing communication without disturbing it.

The disclosure proposes, in at least one embodiment, a technique of this kind for increasing the redundancy of data transmission in the network.

The disclosure proposes, in at least one embodiment, a technique of this kind for unambiguously identifying a sender device in which a simultaneous communication has to be made.

The disclosure further proposes, in at least one embodiment, a technique of this kind that is simple to implement at low cost.

The invention claimed is:

1. A method for managing communications between devices in a wireless network having a shared bandwidth and for setting up a first communication on a plurality of carriers between a first sender device and a receiver device,
wherein a manager device performs the steps of:
allocating a unique spectral signature to at least one second sender device, the allocated unique spectral signature being formed by a set of at least one carrier among said plurality of carriers on which the first communication is set up;
obtaining, for each second sender device, a reception power level for a predetermined signal sent by said second sender device on its respective allocated unique spectral signature;
estimating a rate of disturbance of said first communication by one or several of second communications to be established simultaneously with said first communication as a function of the power level(s) obtained for the second sender device(s);
authorizing the second sender device(s), for which the estimated rate(s) of disturbance is or are below a predefined threshold, to set up said second communication its respective allocated unique spectral signature for sending data simultaneously on said first communication and said second communication; and
disallowing the second sender device(s), for which the estimated rate(s) of disturbance is or are equal to or above said predefined threshold, to set up said second communication,
wherein each allocated unique spectral signature is separated from another allocated unique spectral signature by a frequency distance greater than a first threshold in function of an acceptable frequency error tolerance in the network.

2. The method according to claim 1 wherein, in the step of allocating a unique spectral signature to each second sender device, the allocation of unique spectral signatures is done distributedly on the plurality of carriers.

3. The method according to claim 1, wherein the first communication is set up during a first time slot of a transmission cycle
and wherein the predetermined signal or signals is or are sent out by the second sender device or devices during a second time slot of said transmission cycle, different from the first time slot.

4. The method according to claim 3, wherein said second communication or communications are set up after a predetermined duration starting from the starting instant of said first time slot.

5. The method according to claim 1 wherein, for a second given sender device, the power level of the received predetermined signal is a function of the reception power levels received through at least one carrier of the unique spectral signature allocated to said second given sender device.

6. The method according to claim 5, wherein the power level of the received predetermined signal results also from an addition of a power level received through at least one adjacent carrier and wherein a carrier is said to be adjacent if it is separated by a distance smaller than or equal to an acceptable frequency error tolerance in the network relative to a carrier of the allocated unique spectral signature allocated to said second sender device.

7. The method according to claim 1, the first sender device and/or the receiver device being capable of being configured according to a plurality of transmission configurations each enabling the implementation of said first communication, wherein the step of estimating a rate of disturbance is performed for each of the configurations of said plurality of configurations.

8. The method according to claim 7, wherein it comprises steps of:
determining, for at least one transmission configuration, a number of second sender devices for which said rate or rates of estimated disturbance are below said predefined threshold;
selecting a configuration from among said plurality of transmission configurations as a function of the determined number or numbers of second sender devices for which the estimated rate or rates of disturbance are below said predefined threshold;
configuring the first sender device and a receiver device according to the selected transmission configuration.

9. The method according to claim 1, wherein said receiver device is the manager device.

10. A device for managing communications in a wireless network having a shared bandwidth, a first communication being set up in said network on a plurality of carriers between a first sender device and a receiver device, wherein said device for managing communications comprises:
means for allocating a unique spectral signature to at least one second sender device, the allocated unique spectral signature being formed by a set of at least one carrier among said plurality of carriers on which the first communication is set up;
means for obtaining, for each second sender device, a reception power level for a predetermined signal sent by said second sender device on its respective allocated unique spectral signature;
means for estimating a rate of disturbance of said first communication by one or several of second communications to be established simultaneously with said first communication as a function of the power level(s) obtained for the second sender device(s);
means for authorizing the second sending device(s), for which the estimated rate(s) of disturbance is or are below a predefined threshold, to set up said second communication on its respective allocated unique spectral signature for sending data simultaneously on said first communication and said second communication; and means for disallowing the second sender device(s), for which the estimated rate(s) of disturbance is or are equal to or above said predefined threshold, to set up said second communication,
wherein each allocated unique spectral signature is separated from another allocated unique spectral signature by a frequency distance greater than a first threshold in function of an acceptable frequency error tolerance in the network.

11. A method for the setting up, in a wireless network, a second communication for transmission of data, by means of a second sender device, this second communication being a communication to be set up simultaneously with a first communication set up on a plurality of carriers between a first sender device and a receiver device, wherein the method comprises steps of:
sending a predetermined signal on a unique spectral signature on which the first communication is set up, wherein each unique spectral signature is separated from another unique spectral signature by a frequency distance greater than a frequency distance threshold as a function of an acceptable frequency error tolerance in the network;
setting up said second communication for transmission of data, as a function of an estimation of a level of disturbance of the first communication, the estimation being done on the basis of an obtained level of reception power of the predetermined signal, wherein the disturbance is between a nominal power of received during the first communication and an apparent power of other sender devices,
wherein the step of setting up said second communication for transmission of data comprises a step of obtaining an estimation of a margin of attenuation between the first communication and the second communication, on the basis of the estimation of the level of disturbance of the first communication,
wherein, should the estimation of the margin of attenuation be below or equal to a predefined disturbance threshold, the second communication is set up with an emission power of the second sender device reduced in function of the estimation of the margin of attenuation; and
transmitting data on the setup second communication.

12. A method for identifying devices of a wireless network having a shared bandwidth and in which communications in between devices are set up over transmission cycles, a first communication being set up on a plurality of carriers between a first sender device and a receiver device, said network comprising a set of at least one second sender device for which a second communication has to be established simultaneously with said first communication,
wherein a manager device performs the steps of:
allocating a unique spectral signature to each second sender device, the allocated unique spectral signature being formed by a set of at least one carrier among said plurality of carriers on which the first communication is set up, wherein each allocated unique spectral signature is separated from another allocated unique spectral signature by a frequency distance greater than a frequency distance threshold as a function of an acceptable frequency error tolerance in the network;
allocating at least one time slot in said transmission cycles, in which the devices of the wireless network may concurrently transmit a predetermined signal on their respective allocated unique spectral signature;
receiving a signal during said allocated time slot(s); and
identifying at least one device on the basis of said signal received and on the basis of the carrier(s) allocated unique spectral signature.

13. A second sender device constructed to set up, in a wireless network, a second communication for transmission of data simultaneously with a first communication on a plurality of carriers between a first sender device and a receiver device, wherein said second sender device comprises:
means for sending a predetermined signal on a unique spectral signature on which the first communication is set up, wherein each unique spectral signature is separated from another unique spectral signature by a frequency distance greater than a frequency distance threshold as a function of an acceptable frequency error tolerance in the network;
means for setting up said second communication for transmission of data, as a function of an estimation of a level of disturbance of the first communication, the estimation being done on the basis of an obtained level of reception power of the predetermined signal, wherein the disturbance is between a nominal power of received during the first communication and an apparent power of other sender devices,
wherein the means for setting up said second communication obtains an estimation of a margin of attenuation between the first communication and the second communication, on the basis of the estimation of the level of disturbance of the first communication, and
wherein, should the estimation of the margin of attenuation be below or equal to a predefined disturbance threshold, the second communication is set up with an emission power of the second sender device reduced in function of the estimation of the margin of attenuation; and
transmitting data on the setup second communication.

14. A non-transitory computer-readable storage medium, storing a computer program comprising a set of instructions executable by a computer in order to implement a method for managing communications in a wireless network having a shared bandwidth and for setting up a first communication on a plurality of carriers between a first sender device and a receiver device, wherein a manager device performs the steps of:
allocating a unique spectral signature to at least one second sender device, the allocated unique spectral signature being formed by a set of at least one carrier among said plurality of carriers on which the first communication is set up, wherein each allocated unique spectral signature is separated from another allocated unique spectral signature by a frequency distance greater than a frequency distance threshold as a function of an acceptable frequency error tolerance in the network;
obtaining, for each second sender device, a reception power level for a predetermined signal sent by said second sender device on its respective allocated unique spectral signature;
estimating a level of disturbance of said first communication by one or several second communications to be established simultaneously with said first communication as a function of the power level(s) obtained for the second sender device(s), wherein the disturbance is between the nominal power of received during the first communication and the apparent power of the other sender devices;
authorizing the second sender device(s), for which the estimated level of disturbance is or are below a predefined disturbance threshold, to set up said second communication on its respective allocated unique spectral signature for sending data simultaneously on said first communication and said second communication, wherein the predefined disturbance threshold is a difference between a noise level acceptable for the first communication and the estimated level of disturbance; and
disallowing the second sender device(s), for which the estimated level of disturbance is or are equal to or above said predefined disturbance threshold, to set up said second communication.

\* \* \* \* \*